(12) United States Patent  
Park et al.

(10) Patent No.: US 12,111,412 B2  
(45) Date of Patent: Oct. 8, 2024

(54) ELECTRONIC CONTROL DEVICE AND METHOD

(71) Applicant: HL Klemove Corp., Pyeongtaek-si (KR)

(72) Inventors: Jong Gyu Park, Yongin-si (KR); JunYoung Kim, Seongnam-si (KR); KwanHo Kim, Suwon-si (KR)

(73) Assignee: HL KLEMOVE CORP., Incheon (KR)

( * ) Notice: Subject to any disclaimer, the term of this patent is extended or adjusted under 35 U.S.C. 154(b) by 412 days.

(21) Appl. No.: 17/677,487

(22) Filed: Feb. 22, 2022

(65) Prior Publication Data

US 2022/0268879 A1  Aug. 25, 2022

(30) Foreign Application Priority Data

Feb. 23, 2021  (KR) .......................... 10-2021-0024062

(51) Int. Cl.  
*G01S 7/02* (2006.01)  
*G01S 13/931* (2020.01)

(52) U.S. Cl.  
CPC ............ *G01S 7/023* (2013.01); *G01S 13/931* (2013.01)

(58) Field of Classification Search  
CPC ...... G01S 7/023; G01S 13/931; G01S 13/343; G01S 13/34  
See application file for complete search history.

(56) References Cited

U.S. PATENT DOCUMENTS

| 9,223,009 B1 | 12/2015 | Wasiewicz | |
|---|---|---|---|
| 2006/0220944 A1* | 10/2006 | Ikeda | ......................... G01S 7/28 |
| | | | 342/134 |
| 2012/0105273 A1* | 5/2012 | Nettelblad | .............. H02M 1/44 |
| | | | 342/201 |
| 2012/0229323 A1* | 9/2012 | Kato | ..................... G01S 7/0232 |
| | | | 342/27 |
| 2015/0331089 A1* | 11/2015 | Yukumatsu | ............... G01S 7/35 |
| | | | 342/27 |
| 2016/0131740 A1* | 5/2016 | Yoo | ......................... G01S 7/023 |
| | | | 342/70 |

(Continued)

FOREIGN PATENT DOCUMENTS

| CN | 101887282 A | 11/2010 |
|---|---|---|
| CN | 105589059 A | 5/2016 |

(Continued)

OTHER PUBLICATIONS

TranslationKR20190117932A.pdf, translation of KR 20190117932 A (Year: 2018).*

(Continued)

*Primary Examiner* — Timothy A Brainard  
*Assistant Examiner* — Kenneth W Good  
(74) *Attorney, Agent, or Firm* — Harvest IP Law, LLP (57) ABSTRACT

The disclosure relates to an electronic control device and method. According to the disclosure, an electronic control device comprises a sensor unit receiving a reception signal detecting an object and processing the reception signal to obtain object information, a power supply unit supplying power to the sensor unit and processing a signal for a predetermined frequency, and a controller adjusting a frequency processed by the power supply unit in each operation period of the sensor unit.

15 Claims, 10 Drawing Sheets

(56) References Cited

U.S. PATENT DOCUMENTS

| | | | |
|---|---|---|---|
| 2016/0146933 A1* | 5/2016 | Rao | G01S 13/583 |
| | | | 342/132 |
| 2016/0368386 A1* | 12/2016 | Noguchi | H02J 50/20 |
| 2018/0262061 A1 | 9/2018 | Tanabe | |
| 2020/0355791 A1* | 11/2020 | Gora | G01S 13/343 |
| 2021/0036709 A1 | 2/2021 | Yoon et al. | |
| 2023/0273293 A1* | 8/2023 | Nishikido | G01S 13/931 |
| | | | 342/175 |

FOREIGN PATENT DOCUMENTS

| | | | |
|---|---|---|---|
| JP | 2007208634 A1 | | 8/2007 |
| JP | 2010175289 A | | 8/2010 |
| KR | 20120052903 A1 | | 5/2012 |
| KR | 10-2015-0010139 A | | 1/2015 |
| KR | 20190117932 A | * | 4/2018 |
| KR | 10-2019-0095001 A | | 8/2019 |
| KR | 20190117932 A1 | | 10/2019 |

OTHER PUBLICATIONS

Office Action issued in KR Patent Application No. 2021 0024062 dated Mar. 15, 2023 with English Translation.
Notice of Allowance issued Sep. 4, 2023 for counterpart Korean Patent Application No. 10-2021-0024062.
Spread spectrum frequency modulation to reduce EMI, Greg Zimmer.

\* cited by examiner

ELECTRONIC CONTROL DEVICE AND METHOD

CROSS-REFERENCE TO RELATED APPLICATION

This application claims priority from Korean Patent Application No. 10-2021-0024062, filed on Feb. 23, 2021, which is hereby incorporated by reference for all purposes as if fully set forth herein.

BACKGROUND

Field

The present embodiments relate to an electronic control device and method.

Description of Related Art

Switched power conversion causes electromagnetic interference (EMI). To prevent power conversion from disturbing other electronic devices, predetermined requirements for the maximum acceptable interference level should be met. These interferences are measured over a frequency interval. One of the solutions to reduce interferences to an acceptable level is to use a filter. Another solution is to spread the energy of the interference over a wide frequency interval through frequency modulation of the switching frequency.

As such, a spreading spectrum technique for changing the frequency of a clock may be used to reduce EMI generated in an electronic device. A spread spectrum clock is a clock having a spectrum spread by intentionally applying random jitter to an existing clock signal by an electronic device to reduce EMI.

BRIEF SUMMARY

In the foregoing background, according to the disclosure, there is provided an electronic control device and method for adjusting a target frequency of a spread spectrum.

To address the foregoing issues, in an aspect of the disclosure, there is provided an electronic control device comprising a sensor unit receiving a reception signal detecting an object and processing the reception signal to obtain object information, a power supply unit supplying power to the sensor unit and processing a signal for a predetermined frequency, and a controller adjusting a frequency processed by the power supply unit in each operation period of the sensor unit.

In another aspect of the disclosure, there is provided an electronic control method comprising a frequency processing step processing a signal for a predetermined frequency, an object information reception step receiving a reception signal detecting an object and processing the reception signal to obtain object information, and a frequency adjustment step adjusting a frequency signal-processed in each operation period of the sensor unit.

According to the disclosure, it is possible to reduce creation of a false target in the operation range of a sensor and to suppress a rise in noise floor and the sensor's frequency external influence.

DESCRIPTION OF DRAWINGS

The above and other objects, features, and advantages of the present disclosure will be more clearly understood from the following detailed description, taken in conjunction with the accompanying drawings, in which.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

An electronic control device 10 is described below with reference to the accompanying drawings, according to an embodiment of the disclosure.

Figure 1:
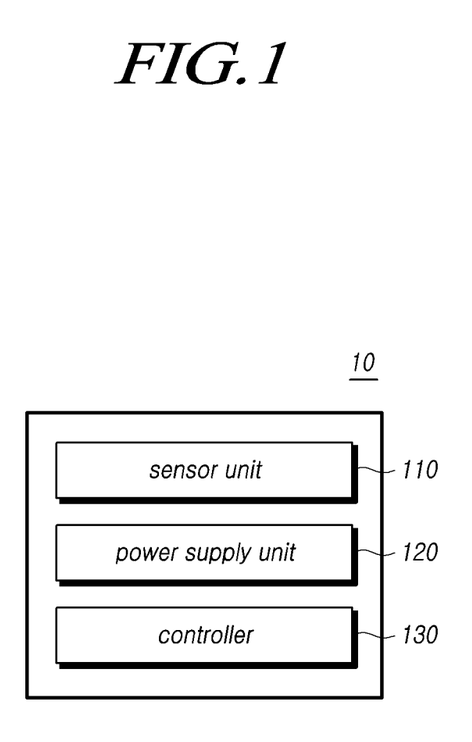
FIG. 1 is a block diagram illustrating an electronic control device according to an embodiment of the disclosure.

FIG. 1 is a block diagram illustrating an electronic control device 10 according to an embodiment of the disclosure.

Referring to FIG. 1, according to an embodiment of the disclosure, an electronic control device 10 may include a sensor unit 110, a power supply unit 120, and a controller 130.

In general, frequency authentication is an essential requirement for all electronic products. As a method for reducing external influence by decreasing unnecessary frequency components generated by the product, ICs having the function of the power supply unit 120 may provide a spread spectrum function.

Figure 2A:
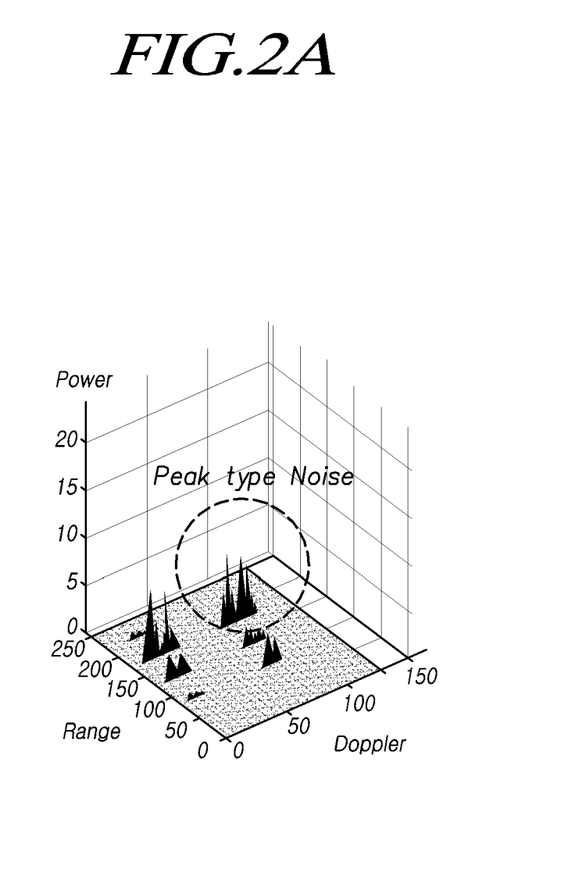
FIGS. 2A, 2B, and 3 are views illustrating a general spread spectrum according to an embodiment.
Figure 2B:
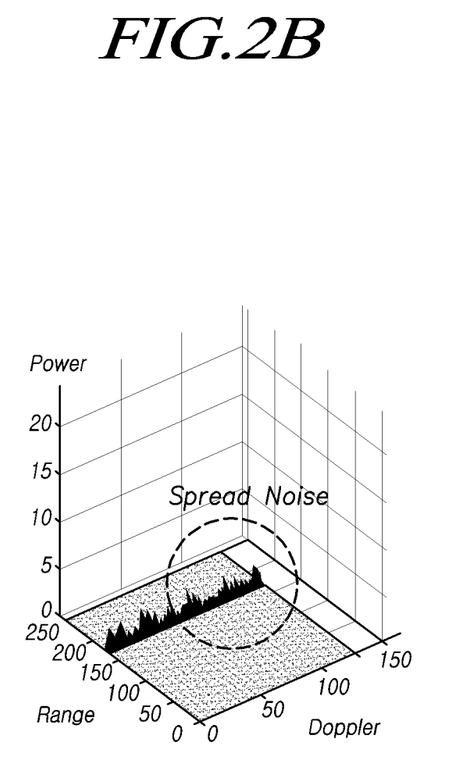
Figure 3:
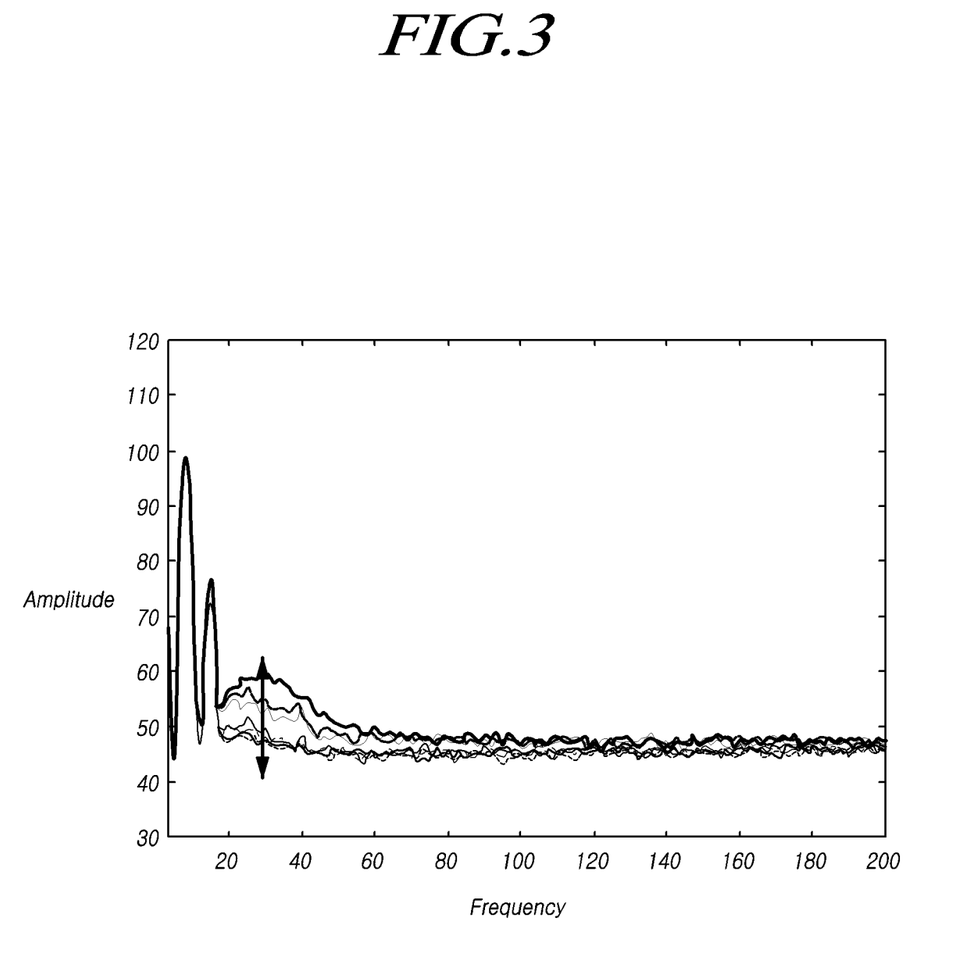

FIGS. 2A, 2B, and 3 are views illustrating a general spread spectrum according to an embodiment.

Referring to FIGS. 2A and 2B, as in FIG. 2A, if high noise is generated for a specific frequency, the sensor may cause misdetection in signal processing and may detect a ghost. According, if spread spectrum is performed on a specific frequency with a high peak-type noise as shown in FIG. 2A, the power of the specific frequency may be spread into low power as shown in FIG. 2B.

As spread spectrum is driven, the amplitude width of the low frequency band may be identified to rise as shown in FIG. 3.

This function may advantageously suppress a strong frequency occurrence signal by providing an effective frequency spreading effect. However, as used in a noise-sensitive sensor module, it may create a false target in the sensor operation range or cause a rise in noise floor.

To address these issues, the electronic control device 10 may provide a method of reducing the frequency without affecting the detection by the sensor, with the advantages of the spread spectrum, by adjusting the target frequency of the spread spectrum.

Referring back to FIG. 1, the sensor unit 110 may receive a reception signal detecting an object and process the reception signal, obtaining object information.

The sensor unit 110 may receive a reception signal from a sensor. The sensor may include an antenna unit, a reception unit, and a transmission unit. The antenna unit may include one or more transmission antennas and one or more reception antennas.

Each transmission/reception antenna may be an array antenna including one or more radiation elements connected in series through feeding lines but is not limited thereto.

The antenna unit may include a plurality of transmission antennas and a plurality of reception antennas and may have various array structures depending on the arrayed order and arrayed interval.

The transmission unit may switch to one of the plurality of transmission antennas included in the antenna unit to transmit transmission signals through the switched transmission antenna or may transmit transmission signals through multiple transmission channels allocated to the plurality of transmission antennas.

The transmission unit may include an oscillation unit that generates transmission signals for one transmission channel allocated to the switched transmission antenna or multiple transmission channels allocated to the plurality of transmission antennas. The oscillation unit may include, e.g., a voltage-controlled oscillator (VCO) and an oscillator.

The reception unit may receive a reception signal reflected by the object, through the reception antenna.

The reception unit may switch to one of the plurality of reception antennas and receive the reception signal, which is the transmission signal reflected by the target, through the switched reception antenna or receive the reception signal through multiple reception channels allocated to the plurality of reception antennas.

The reception unit may include, e.g., a low noise amplifier (LNA) that low-noise amplifies the reception signal, which is received through one reception channel allocated to the switched reception antenna or through multiple reception channels allocated to the plurality of reception antennas, a mixer that mixes the low-noise amplified reception signal, an amplifier that amplifies the mixed reception signal, and an analog-digital converter (ADC) that converts the amplified reception signal into a digital signal to thereby generate reception data.

Accordingly, the sensor unit 110 may include a radar signal transmission module, which controls to transmit a radar signal to the object using the transmission antenna, and a reception module, which receives the reception signal reflected by the object, through the reception antenna.

The sensor unit 110 may perform a signal reception operation for receiving the reception signal detecting an object through the transmission antenna and the reception antenna and a signal processing operation for obtaining object information by processing the reception signal. The reception signal may be received through the above-described reception module. Object information may be obtained through, e.g., fast Fourier transform (FFT) and measurement based on the received reception signal.

The sensor unit 110 may repeatedly perform the above-described signal reception operation and signal processing operation. The sensor unit 110 may set each of the signal reception operation and the signal processing operation as a unit operation. In other words, the operation period of the sensor unit 110 may mean a period during which each of the signal reception operation and the signal processing operation which are unit operations is performed once.

The power supply unit 120 may supply power to the sensor unit 110 and process a signal for a predetermined frequency.

The power supply unit 120 may supply power to the sensor unit 110 and the controller 130. The power supply unit 120 may supply an appropriate voltage according to each element through a regulator. The power supply unit 120 may drive spread spectrum at a predetermined frequency, thereby processing a signal for the corresponding frequency.

The power supply unit 120 may drive spread spectrum on a command frequency received from the controller 130, as described below, but the power supply unit 120 may adjust the frequency according to a preset table in each operation period to thereby drive spread spectrum on the adjusted frequency.

The power supply unit 120 may receive an adjusted frequency sync signal from the controller 130 and drive spread spectrum on the same frequency as the corresponding frequency.

The power supply unit 120 may include at least one low drop out (LDO).

The controller 130 may adjust the frequency applied to spread spectrum in each operation period of the sensor unit 110.

The controller 130 may adjust the frequency applied to spread spectrum after the signal processing operation is performed. The controller 130 may adjust the frequency applied to spread spectrum while the signal processing operation is performed.

In other words, the controller 130 may adjust the frequency applied to spread spectrum while the signal reception operation is performed.

Figure 4:
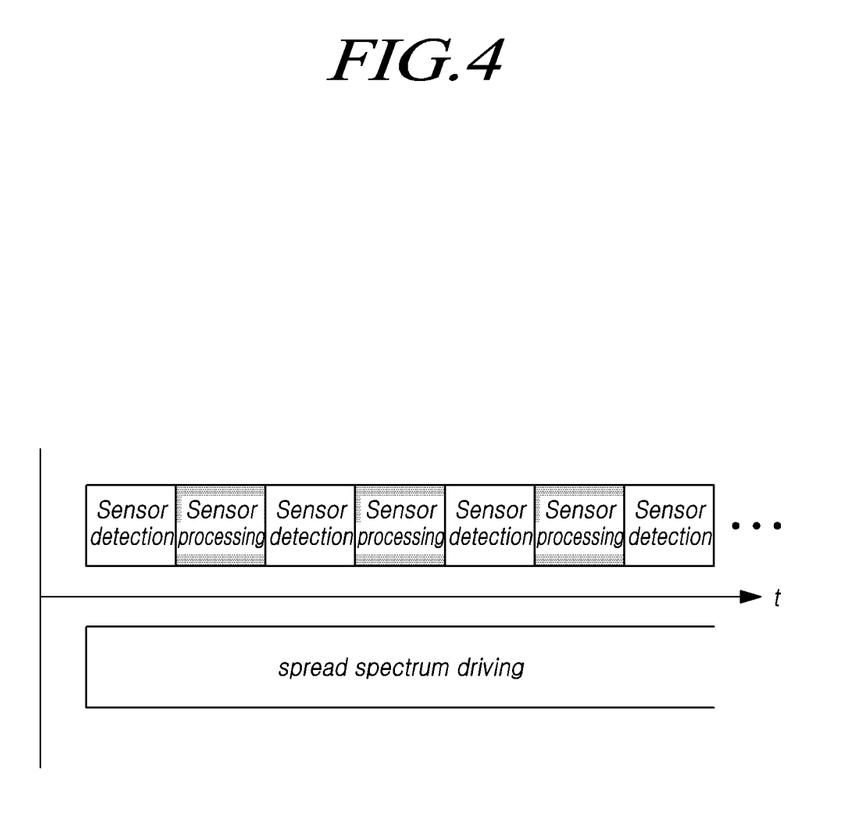
FIG. 4 is a view illustrating driving a spread spectrum of a general power IC over time, according to an embodiment.
Figure 5:
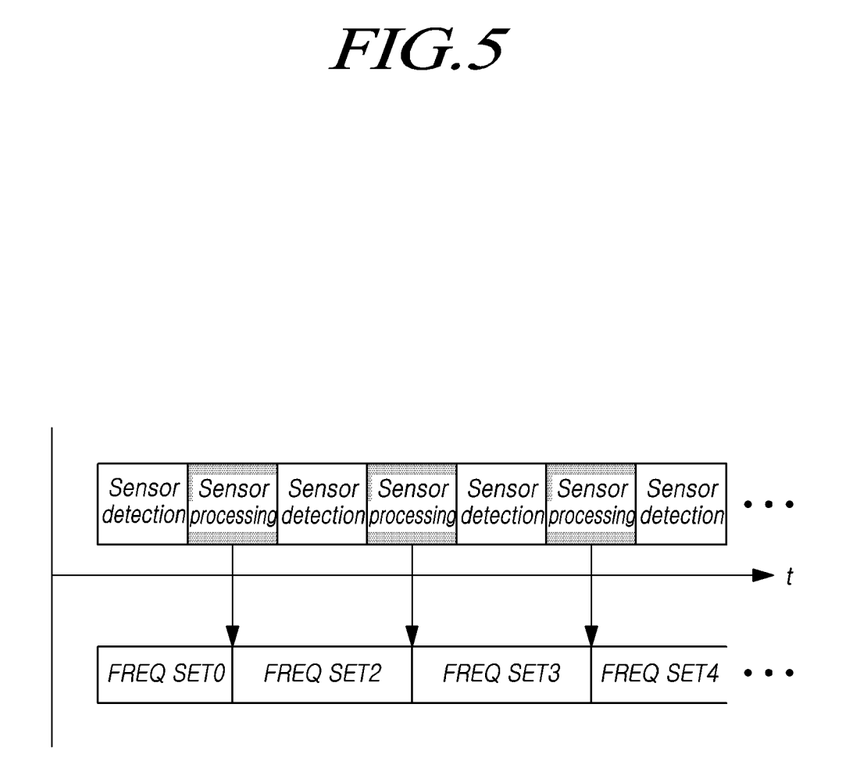
FIG. 5 is a view illustrating driving a spread spectrum over time by an electronic control device according to an embodiment of the disclosure.

FIG. 4 is a view illustrating driving a spread spectrum of a general power IC over time, according to an embodiment. FIG. 5 is a view illustrating driving a spread spectrum over time by an electronic control device 10 according to an embodiment of the disclosure.

Referring to FIG. 4, the spread spectrum driving by a general power IC is to drive spread spectrum on a fixed specific frequency.

In contrast, referring to FIG. 5, according to the disclosure, the electronic control device 10 may adjust the frequency during sensor processing, i.e., signal processing operation, and drive spread spectrum on the adjusted frequency.

For example, in FIG. 5, it may be identified that FREQ SET0 is changed to FREQ SET1 during a first signal processing operation. This may mean that the frequency set in FREQ SET0 is adjusted to the frequency set in FREQ SET1.

FIG. 5 is merely an example and, as described above, the time of frequency adjustment may be set to a time after the signal processing operation is ended. In other words, when the object is detected, the electronic control device 10 may be configured to perform three steps, i.e., the signal reception operation and signal processing operation by the sensor unit 110, and a frequency adjustment operation by the power supply unit 120.

As described above, according to the disclosure, the electronic control device may suppress external influence on the sensor by adjusting the frequency in each operation period.

Figure 6:
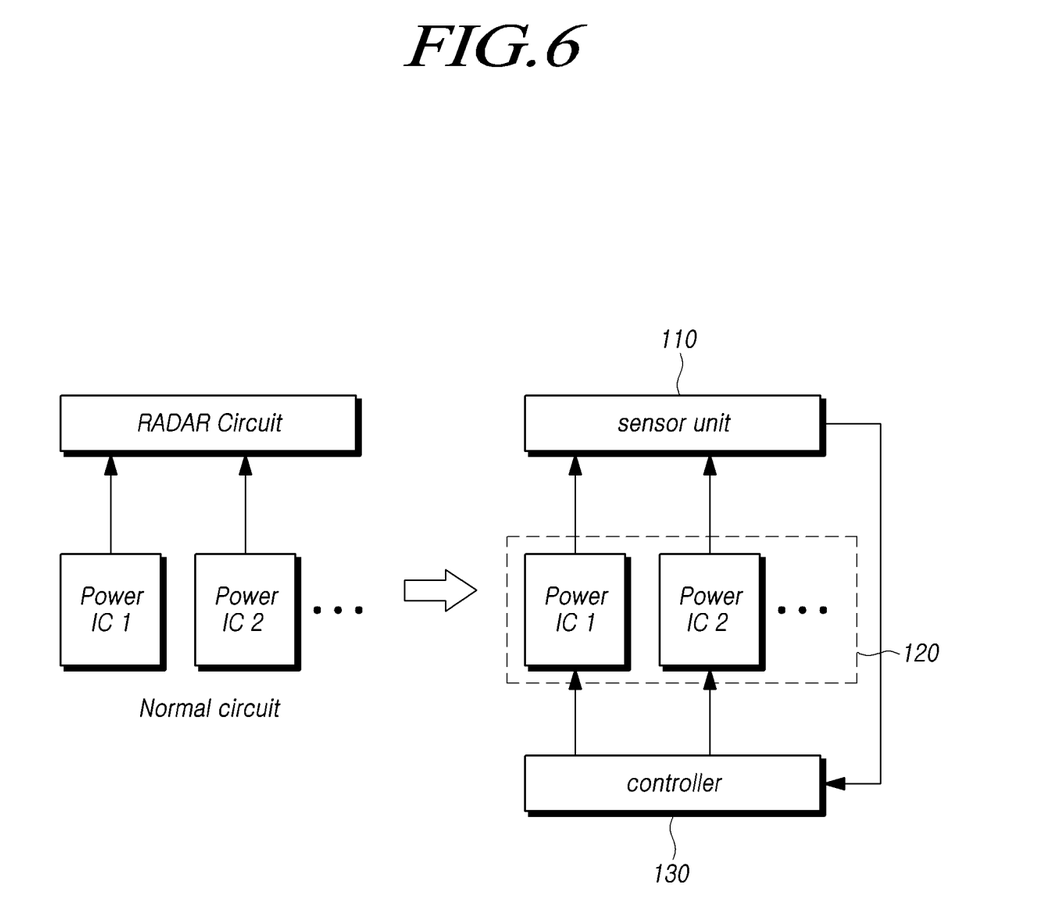
FIG. 6 is a block diagram illustrating adjusting a frequency applied to a spread spectrum by an electronic control device according to an embodiment of the disclosure.

FIG. 6 is a block diagram illustrating adjusting a frequency applied to a spread spectrum by an electronic control device 10 according to an embodiment of the disclosure.

Referring to FIG. 6, the electronic control device 10 may adjust, by the controller 130, the frequency to be applied to spread spectrum based on object information obtained by the sensor unit 110, transmit the corresponding frequency to the power supply unit 120 to drive spread spectrum, and apply the spread spectrum to the sensor unit 110 so that a spread spectrum effect may be applied to the reception signal.

If the sensor unit 110 processes the reception signal and first objects object information, the power supply unit 120 may drive spread spectrum at a predetermined first frequency, not the adjusted frequency. Here, the first frequency may be, e.g., a frequency which is generally fixed and applied to a power IC. Spread spectrum may be driven by applying such first frequency.

The controller 130 may adjust the frequency based on the object information obtained by the sensor unit 110.

The controller 130 may exclude the frequency at which the object is detected from among to-be-adjusted frequencies. The object information may be obtained based on the peak value of the reception signal resultant from detecting the object. If spread spectrum is applied to the object detection frequency, the peak value may reduce, causing it impossible to accurately detect the object. Accordingly, the controller 130 may adjust the frequency to allow the sensor to more accurately detect the object by excluding the frequency at which the object is detected.

The controller 130 may adjust the value, which results from adding a predetermined frequency in each operation period of the sensor unit 110 to the frequency of the pre-driven spread spectrum, to the frequency to be applied to spread spectrum. Alternatively, the controller 130 may adjust the value, which results from subtracting a predetermined frequency in each operation period of the sensor unit 110 from the frequency of the pre-driven spread spectrum, to the frequency to be applied to spread spectrum.

Depending on a context, the controller 130 may transmit a control signal for driving spread spectrum only in a specific period to the power supply unit 120. For example, referring to FIG. 5, the controller 130 may transmit a control signal, which allows spread spectrum to be driven only in FREQ SET0, FREQ SET2, FREQ SET4, . . . , to the power supply unit 120. The controller 130 may also transmit a control signal to the power supply unit 120 so that the frequency applied to spread spectrum driven in a specific period is adjusted over time.

Adjusting a frequency by the controller 130 may mean shifting a predetermined frequency to a frequency with a specific center value or changing the spread range set for a predetermined frequency.

The controller 130 may be implemented as a microcontroller unit (MCU). The MCU may include at least one or more of one or more processors, a memory, a storage unit, a user interface input unit, or a user interface output unit which may communicate with one another via a bus. The MCU may also include a network interface for accessing a network. The processor may be a central processing unit (CPU) or semiconductor device that executes processing instructions stored in the memory and/or the storage unit. The memory and the storage unit may include various types of volatile/non-volatile storage media. For example, the memory may include a read only memory (ROM) and a random access memory (RAM).

According to an embodiment of the disclosure, the electronic control device 10 may be an advance driver assistance system (ADAS) that is equipped in a host vehicle to provide information helpful for driving the host vehicle or assist the driver in the host vehicle.

Here, ADAS may refer to various types of advanced driver assistance systems and may include, e.g., autonomous emergency braking, smart parking assistance system (SPAS), blind spot detection (BSD), adaptive cruise control (ACC), lane departure warning system (LDWS), lane keeping assist system (LKAS), and lane change assist system (LCAS). However, embodiments of the disclosure are not limited thereto.

The host vehicle may refer to a vehicle that is equipped with a prime mover to roll the wheels by the power therefrom to move on the ground without a pre-built railway or track. Further, the host vehicle may be an electric vehicle that is an electricity-powered vehicle that obtains driving energy by rotating a motor with electricity from a battery rather than obtaining driving energy from combustion of a fossil fuel.

The electronic control device 10 is applicable both where the host vehicle is a manned vehicle or where the host vehicle 11 is an autonomous vehicle.

Described below is an electronic control method using an electronic control device 10 capable of performing the above-described embodiments of the disclosure.

Figure 7:
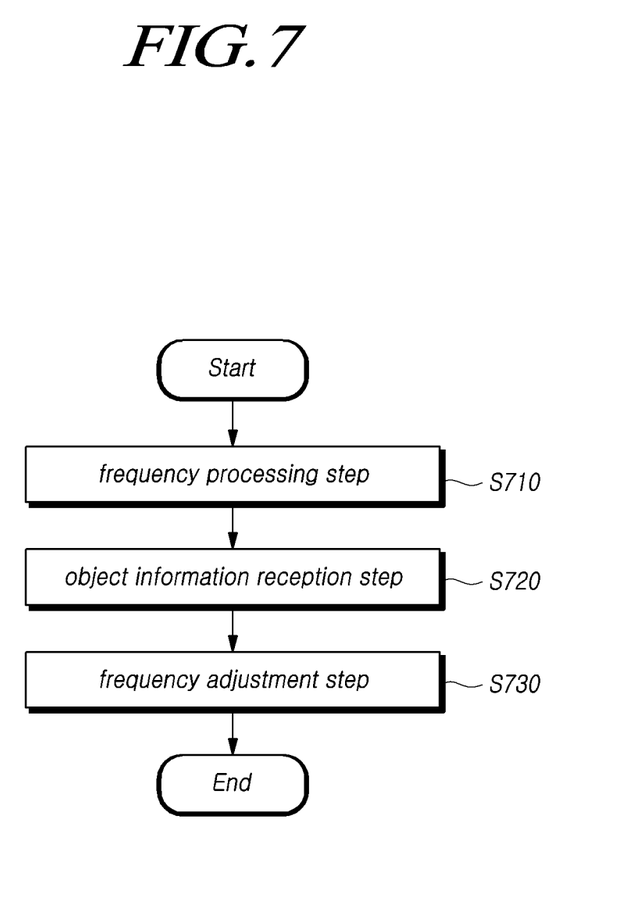
FIG. 7 is a flowchart illustrating an electronic control method according to an embodiment of the disclosure.

FIG. 7 is a flowchart illustrating an electronic control method according to an embodiment of the disclosure.

Referring to FIG. 7, according to the disclosure, an electronic control method may include a frequency processing step S710 supplying power to a sensor unit 110 and processing a signal for a predetermined frequency, an object information reception step S720 receiving a reception signal detecting an object and processing the reception signal to obtain object information, and a frequency adjustment step S730 adjusting a frequency signal processed in each operation period of the sensor unit 110.

The object information reception step S720 may include a signal reception step receiving the reception signal detecting the object and a signal processing step obtaining object information by processing the reception signal.

The frequency adjustment step S730 may adjust the signal-processed frequency after the above-described signal processing step is performed.

The frequency adjustment step S730 may adjust the signal-processed frequency while the above-described signal processing step is performed.

The frequency adjustment step S730 may adjust a value resultant from adding a predetermined frequency in each operation period to the signal-processed frequency to a next frequency to be signal processed.

The frequency processing step S710 may perform signal processing on a predetermined frequency through spread spectrum, and the frequency adjustment step S730 may adjust the frequency to shift a center frequency of the frequency or to change a spread range of the frequency.

Figure 8:
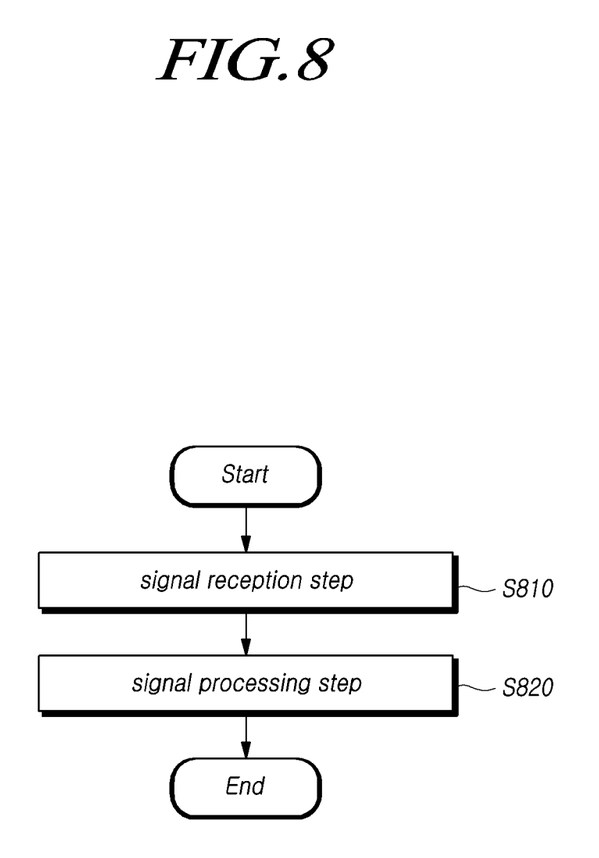
FIG. 8 is a flowchart illustrating, in greater detail, step S720 according to an embodiment.

FIG. 8 is a flowchart illustrating, in greater detail, step S720 according to an embodiment.

Referring to FIG. 8, the electronic control device 10 may include a signal reception step S810 receiving a reception signal detecting the object and a signal processing step S820 obtaining object information by processing the reception signal.

The electronic control device 10 may obtain object information through fast Fourier transform (FFT) and measurement based on the reception signal. For example, the object information may include power in the Doppler or range index as shown in FIG. 2 and may include amplitude at a specific frequency as shown in FIG. 3.

Figure 9:
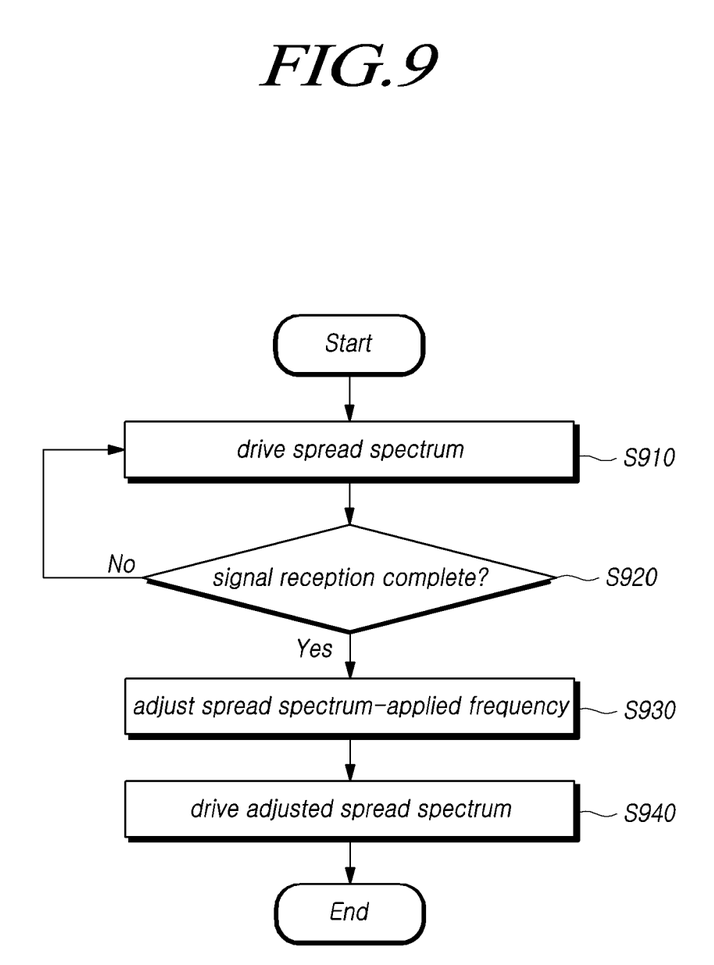
FIG. 9 is a flowchart illustrating adjusting a spread spectrum-applied frequency depending on whether a reception signal is received according to an embodiment.

FIG. 9 is a flowchart illustrating adjusting a spread spectrum-applied frequency depending on whether a reception signal is received according to an embodiment.

The electronic control device 10 may drive spread spectrum (S910). Accordingly, the absolute value of the peak of the specific frequency of the reception signal received by the sensor may reduce. The specific frequency may be the first frequency unless there is a frequency previously adjusted by the electronic control device 10.

The electronic control device 10 may determine whether the reception of the reception signal by the sensor is complete (S920). If the frequency applied to spread spectrum is adjusted before the reception of the reception signal is complete, the data of the reception signal may not be constant. Thus, the object information obtained based on the data may also be incorrect, resulting in an inaccurate position of the object or inaccurate information about the object. Accordingly, if the reception of the reception signal by the sensor is not complete, the electronic control device 10 may keep driving spread spectrum on the frequency (No in S920).

If the reception of the reception signal is complete (Yes in S920), the electronic control device 10 may adjust the frequency applied to spread spectrum based on the object information obtained based on the reception signal (S930).

In an embodiment, the electronic control device 10 may receive the reception signal from the sensor and receive the object information obtained based on the reception signal from the sensor. In this case, the step S920 of determining whether the reception of the reception signal is complete may be whether the reception of the reception signal by the sensor is complete.

The frequency adjustment step S930 may be performed after the signal processing step S820 is performed.

The frequency adjustment step S930 may be performed while the signal processing step S820 is performed.

The electronic control device 10 may drive spread spectrum on the adjusted frequency (S940).

Only the frequency value adjusted by the controller 130 may be transmitted to the power supply unit 120 so that the power supply unit 120 may drive spread spectrum on the adjusted frequency. The controller 130 may generate an adjusted frequency sync signal and transmit it to the power supply unit 120, thereby driving spread spectrum on the adjusted frequency. The controller 130 may transmit a frequency adjusted through a separate frequency adjustment module (not shown) to the power supply unit 120.

As described above, according to the disclosure, it is possible to reduce creation of a false target in the operation range of a sensor and to suppress a rise in noise floor and the sensor's frequency external influence.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. An electronic control device, comprising:
   a sensor unit receiving a reception signal detecting an object and processing the reception signal to obtain object information;
   a power supply unit supplying power to the sensor unit and processing a signal for a predetermined frequency; and
   a controller adjusting a frequency processed by the power supply unit in each operation period of the sensor unit,
   wherein the controller adjusts the frequency processed by the power supply unit as a value resultant from adding a predetermined frequency in each operation period of the sensor unit to a signal-processed frequency.

2. The electronic control device of claim 1, wherein the sensor unit includes:
   a radar signal module controlling to transmit a radar signal to an object using a transmission antenna; and a reception module receiving a reception signal reflected by the object, through a reception antenna.

3. The electronic control device of claim 2, wherein the sensor unit performs a signal reception operation for receiving the reception signal detecting the object through the transmission antenna and the reception antenna and a signal processing operation for obtaining the object information by processing the reception signal and sets the signal processing operation as a unit operation.

4. The electronic control device of claim 3, wherein the controller adjusts the frequency processed by the power supply unit after the unit operation is performed.

5. The electronic control device of claim 3, wherein the controller adjusts the frequency processed by the power supply unit while the reception signal processing operation is performed.

6. The electronic control device of claim 1, wherein the controller adjusts the frequency based on the object information obtained by the sensor unit.

7. The electronic control device of claim 6, wherein the controller excludes a frequency at which the object is detected from among to-be-adjusted frequencies.

8. The electronic control device of claim 1, wherein the power supply unit processes a signal through spread spectrum on the predetermined frequency, and
wherein the controller adjusts the frequency to shift a center frequency of the frequency or to change a spread range of the frequency.

9. An electronic control method, comprising:
a frequency processing step supplying power to a sensor unit and processing a signal for a predetermined frequency;
an object information reception step controlling to transmit a radar signal to an object, receiving a reception signal reflected by the object through a reception antenna, and processing the reception signal to obtain object information; and
a frequency adjustment step adjusting the signal-processed frequency in each operation period of the sensor unit,
wherein the frequency adjustment step includes adjusting the signal-processed frequency as a value resultant from adding a predetermined frequency in each operation period to a pre-processed frequency.

10. The electronic control method of claim 9, wherein the object information reception step includes a signal reception step receiving a reception signal detecting the object and a signal processing step obtaining the object information by processing the reception signal.

11. The electronic control method of claim 10, wherein the frequency adjustment step includes adjusting the signal-processed frequency after the signal processing step is performed.

12. The electronic control method of claim 10, wherein the frequency adjustment step includes adjusting the signal-processed frequency while the signal processing step is performed.

13. The electronic control method of claim 9, wherein the frequency adjustment step includes adjusting the frequency based on the object information obtained by the sensor unit.

14. The electronic control method of claim 13, wherein the frequency adjustment step includes excluding a frequency at which the object is detected from among to-be-adjusted frequencies.

15. The electronic control method of claim 9, wherein the frequency processing step includes processing a signal through spread spectrum on the predetermined frequency, and
wherein the frequency adjustment step includes adjusting the frequency to shift a center frequency of the frequency or to change a spread range of the frequency.

* * * * *